FORREST W. BROWN
*INVENTOR.*

BY Ralph E. Bitner
ATTORNEY

United States Patent Office 2,720,039
Patented Oct. 11, 1955

2,720,039

MOVING RADAR TARGET GENERATING DEVICES

Forrest W. Brown, New Canaan, Conn., assignor to The Reflectone Corporation, Stamford, Conn., a corporation of Connecticut Application October 13, 1952, Serial No. 314,533

7 Claims. (Cl. 35—10.4)

This invention relates to a radar target generating device and has particular reference to a target generator for a radar receiving system which shows targets in motion. The invention also has reference to a circuit arrangement which simulates the radar pulses which can be applied to a radar indicator. The device is used for training purposes and may also be used for testing certain types of radar receivers.

Several types of target generators have been employed to furnish the radar pulses which could be applied to various types of receiving systems. However, these generators have been capable of showing a target pattern which is immovable. It is obvious that an arrangement which simulates moving targets is not only closer to the actual operation of radar devices, but also provides additional training and experience for the operator.

One of the objects of this invention is to provide an improved target generating device which avoids one or more of the disadvantages and limitations of prior art arrangements.

Another object of the invention is to provide a target generating device in which the movements of the targets have been predetermined and recorded on film.

Another object of the invention is to provide a target generating device with movable targets in a manner which can be reproduced many times.

Another object of the invention is to provide a means for simulating several moving radar targets, each of which can be shown moving in a different direction.

Another object of the invention is to provide a target generating device having all the flexibility of a standard radar indicator thereby permitting the operator to rotate the simulated antenna at a constant velocity or at a varying velocity controlled by a manually operated wheel.

The invention includes a standard radar plan position indicator (P. P. I.) and its associated video amplifier. The amplifier input is connected to a photoelectric cell which picks up the variations in light from a flying spot cathode ray tube shining through a moving transparency. The vertical range sweep generator is controlled by pulses sent out by the radar indicator, while the horizontal sweep voltage is obtained from the rotating arm of a circular voltage divider. The transparency is moved in front of the flying spot screen by a constant speed motor. The radar indicator yoke is rotated either by a variable speed motor or by hand. The arm which moves around the voltage divider is moved by one of the gears in a gear differential mechanism, the other two gears being connected to the constant speed transparency motor and the radar indicator yoke.

For a better understanding of the present invention, together with other and further objects thereof, reference is made to the following description taken in connection with the accompanying drawings.

Figure 1:
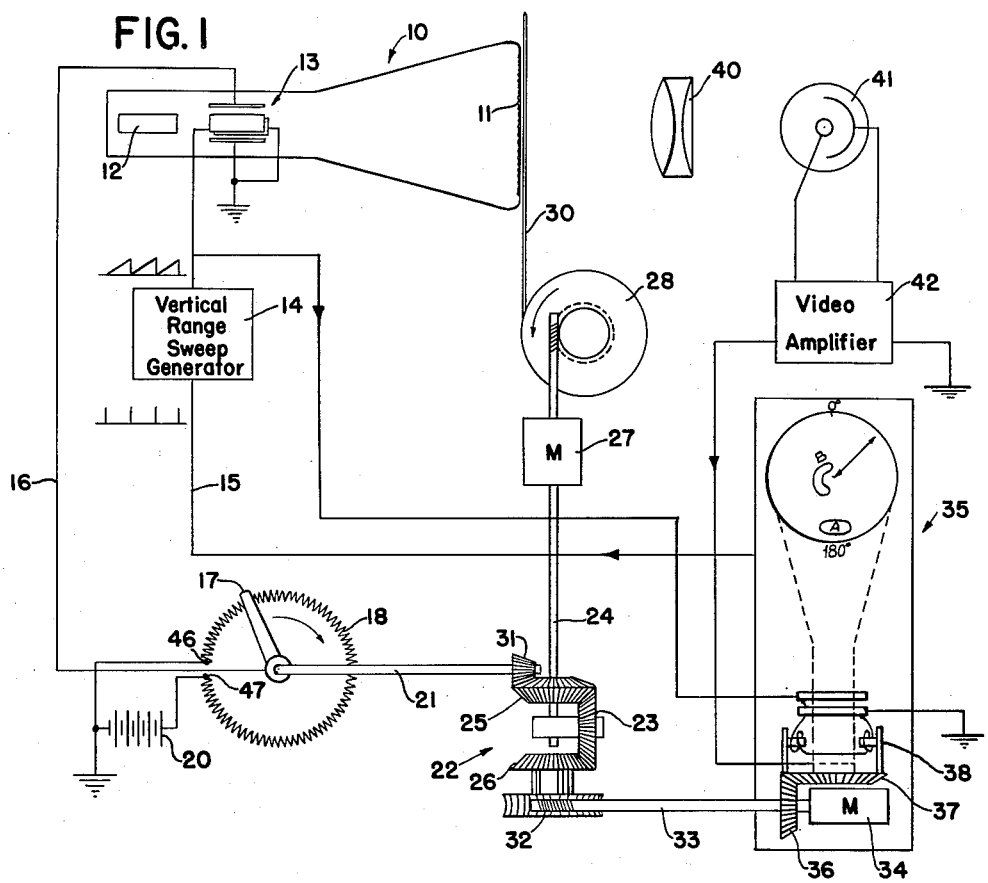
Fig. 1 is a schematic diagram of connections of the target generating device, showing some components in block form.

Referring now to the drawings, a cathode ray tube 10 includes a fluorescent screen 11, an electron gun 12, and the usual electrostatic deflection plates 13. The plates which control the vertical position of the cathode ray spot are connected to a sweep generator 14 which produces the standard saw-tooth wave generally employed for sweep operation. Since this wave must be in synchronism with the sweep generator in the radar indicator device, it is controlled by discrete voltage pulses received over conductor 15. The horizontal deflection plates are energized by a saw-tooth wave received over conductor 16 which is generated by a revolving contact arm 17 which makes contact with a circular resistor 18. This resistor has end terminals 46, 47 positioned close to each other and connected to a source of direct current power 20 which may be a battery. Contact arm 17 is turned by a shaft 21 which is coupled to a differential gear mechanism 22. A planetary pinion 23 is secured to shaft 24 and meshes with gears 25 and 26. Shaft 24 is coupled directly to a constant speed motor 27 which also runs a film spool 28, winding a transparency film 30 and causing it to be drawn along the fluorescent screen 11 of cathode ray tube 10. Gear 25 is connected by a spur gear mechanism 31 to shaft 21 to turn the shaft and contact arm 17. Gear 26 is coupled to a worm gear mechanism 32 which is turned by shaft 33 and a variable speed motor 34 in the base of radar indicator 35. Also coupled to shaft 33 and motor 34 is a gear mechanism 36, 37 which turns a magnetic field yoke 38, which is part of the P. P. I. cathode ray tube.

Directly in front of the cathode ray fluorescent screen 11 and the transparency film 30 is an optical system 40 which focuses the light passing through the film onto the cathode of a photoelectric cell 41. The variations in light received by this photoelectric cell are transformed into voltage impulses and applied to a video amplifier 42. The output of this amplifier is applied to the input system of radar indicator 35.

The operation of this device is as follows: Motor 27 turns the film spool 28 at constant speed and moves the transparency 30 across the face of fluorescent screen 11. The motion of the transparency across the face of the screen proceeds at a constant velocity, regardless of the motions of shafts 21 and 33. The transparency film 30 comprises a transparent film with a target pattern which is opaque to light, the pattern representing the position of one or more targets which are to be shown on a circular radar screen. Since this pattern is formed on the radar screen by the movement of a cathode ray beam between the center of the screen and its periphery, and since the cathode beam in tube 10 moves generally in a vertical direction, the pattern shown on the transparency 30 will be considerably distorted in comparison to the pattern shown on the radar screen receiving set.

Figure 2:
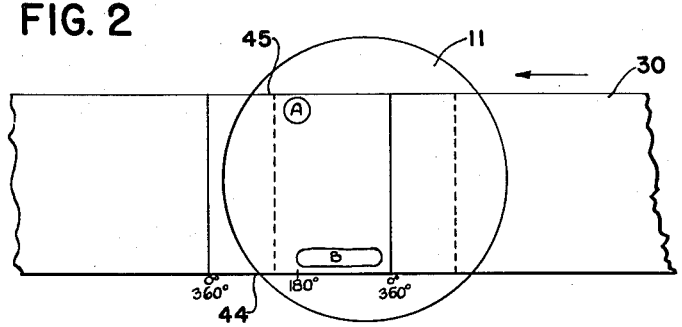
Fig. 2 is a side view of the transparency in front of the cathode ray tube.

Fig. 2 shows a side view of the transparency, having a target pattern shown in one of the frames. In this frame the bottom line 44 represents the entire periphery of the receiving screen. Two targets A and B are shown on film 30 in Fig. 2, and the reproduced pattern is indicated on the radar screen in Fig. 1.

The screen 11 is lighted by the cathode ray beam formed at electron gun 12, and the light which passes through the transparency 30 is focused by lens 40 and transformed into electrical variations by the photoelectric cell 41. The output of this cell is amplified by the video amplifier 42 and delivered to the control electrode in a cathode ray tube in the radar indicator 35, each vertical line on screen 11 being transferred to a radial line on the indicator screen. The angular disposition of the radar screen trace is controlled by a magnetic deflecting yoke 38 which can be turned by a motor or may be turned by the operator using a hand wheel (not shown). The motion of yoke 38 is communicated through gears 37 and 36 and transferred by shaft 33 to the differential gear 32, turning gear 26, which meshes with the pinion gear 23. In this manner the constant motion of shaft 24 and the variable motion of shaft 33 are combined to produce a movement of shaft 21.

As shaft 21 revolves, it carries the contact point 17 around the resistor 18, and if this motion is in a clockwise direction, as indicated in Fig. 1, a saw-tooth wave is produced which starts at zero when arm 17 is on terminal 46 and then increases in a linear manner as the arm is turned until terminal 47 is reached. Then by traversing the gap between these two terminals, the cycle is started over again and another saw-tooth wave is produced. This voltage when applied to the horizontal deflection plates in tube 10 causes the vertical trace of the cathode ray beam to move from one side of the screen to the other.

It will be evident from the above description that whenever a complete frame on transparency 30 coincides with the outlines of screen 11, the beam trace in tube 10 starts at one side of the frame and moves to the other. However, the transparency 30 is moving across the face of the film at a constant velocity, and the first frame, showing one position of the targets, moves away from screen 11; and a second frame, showing a second position of the targets, moves into the scanned area. Under these circumstances the cathode beam in tube 10 is scanning part of one frame and part of another, but the relative position of the targets on the radar indicator does not change because the motion of shaft 24, communicated through gear 23, changes the phase between yoke 38 and contact arm 17 so as to just compensate for the frame motion.

If the operator disengages motor 34 and stops the yoke 38 by manual means to examine some particular target position, the arm 17 will then be moved only by motor 27, acting through gears 23 and 25; and this motion will retain the cathode beam in tube 10 on a particular transparency area, the beam moving from right to left at the same speed as the transparency.

From the above description it will be evident that the device simulates the operation of a standard radar receiving set, providing moving target signals from a film instead of an antenna.

While there have been described and illustrated specific embodiments of the invention, it will be obvious that various changes and modifications may be made therein without departing from the field of the invention which should be limited only by the scope of the appended claims.

I claim:

1. A moving radar target generating device for showing moving targets on a radar screen comprising, a cathode ray tube for illuminating a moving film transparency divided into frames by the application of a first cathode beam to a fluorescent screen, a constant speed motor coupled to the film transparency for moving the film across the face of the fluorescent screen, a light sensitive device for transferring the variations in light transmitted by the film into variations of voltage, circuit means for applying said voltage variations to a radar indicating device having a movable deflection means which directs a second cathode beam to a desired section of a target reproducing screen, a mechanical coupling means which transfers the motion of said movable deflection means to a differential gear mechanism which is also coupled to the constant speed film device and delivers the combined motion to a contact arm on a voltage divider, means for transferring the potential of the contact arm to a deflection means for controlling the position of the first cathode beam, and control means generated by the radar indicating device for controlling the position of the first cathode beam.

2. A moving radar target generating device for showing moving targets on a radar screen comprising, a cathode ray tube for illuminating a moving film transparency by the application of a first cathode beam to a fluorescent screen, a motor coupled to the film transparency for moving the film across the face of the fluorescent screen at a constant speed, the film divided into frames each of which contains a pattern of a target position, a light sensitive device for transferring the variations in light transmitted by the film into variations of voltage, circuit means for applying said voltage variations to a radar indicating device having a movable deflection means which directs a second cathode beam to a desired section of a target reproducing screen, a mechanical coupling means which transfers the motion of said movable deflection means to a differential gear mechanism which is also coupled to the constant speed film device and delivers the combined motion to a contact arm on a voltage divider, means for transferring the potential of the contact arm to a deflection means for controlling the position of the first cathode beam, and control means generated by the radar indicating device for controlling the position of the first cathode beam.

3. A moving radar target generating device for showing moving targets on a radar screen comprising, a cathode ray tube for illuminating a moving film transparency, said cathode ray tube including a fluorescent screen and means for focussing a first cathode beam to a spot on the screen, a constant speed motor coupled to the film for moving the film across the face of the fluorescent screen, a light sensitive device for transferring the variations in light transmitted by the film into variations of voltage, circuit means for applying said voltage variations to a radar indicating device having a movable deflection means which directs a second cathode beam to a desired section of a target reproducing screen, a mechanical coupling means which transfers the motion of said movable deflection means to a differential gear mechanism which is also coupled to the constant speed film device and delivers the combined motion to a contact arm on a voltage divider, means for transferring the potential of the contact arm to a deflection means for controlling the position of the first cathode beam, and control means generated by the radar indicating device for controlling the position of the first cathode beam.

4. A moving radar target generating device for showing moving targets on a radar screen comprising, a cathode ray tube for illuminating a moving film transparency, said cathode ray tube including a fluorescent screen and means for focussing a first cathode beam to a spot on the screen, a constant speed motor coupled to the film for moving the film across the face of the fluorescent screen, a light sensitive device for transferring the variations in light transmitted by the film into variations of voltage, an amplifier for amplifying the voltage variations and applying the amplified power to a radar indicating device having a movable deflection means which directs a second cathode beam to a desired section of a plan position indicator screen, a mechanical coupling means which transfers the motion of said movable deflection means to a differential gear mechanism which is also coupled to the constant speed film motor and delivers the combined motion to a contact arm on a voltage divider, means for transferring the potential of the contact arm to a deflection means for controlling the movement of the first cathode beam in one direction, and control means generated by the radar indicating device for controlling the movement of the first cathode beam in a direction at right angles to the first direction.

5. A moving radar target generating device for showing moving targets on a radar screen comprising, a cathode ray tube for illuminating a moving film transparency, said cathode ray tube including a fluorescent screen and means for focussing a first cathode beam to a spot on the screen, a constant speed motor coupled to the film for moving the film across the face of the fluorescent screen, a light sensitive device for transferring the variations in light transmitted by the film into variations of voltage, an amplifier for amplifying the voltage variations and applying the amplified power to a radar indicating device having a movable deflection means which directs a second cathode beam to a desired section of a plan position indicator screen, a mechanical coupling means which transfers the motion of said movable deflection means to a differential gear mechanism which is also coupled to the constant speed film motor and delivers the combined motion to a contact arm on a voltage divider which carries direct current supplied by a constant voltage source and produces a linear potential drop along a line of contact with said arm, means for transferring the potential of the contact arm to a deflection means for controlling the movement of the first cathode beam in one direction, and control means generated by the radar indicating device for controlling the movement of the first cathode beam in a direction at right angles to the first direction.

6. A moving radar target generating device for showing moving targets on a radar screen comprising, a cathode ray tube for illuminating a moving film transparency, said cathode ray tube including a fluorescent screen and means for focussing a first cathode beam to a spot on the screen, a constant speed motor coupled to the film for moving the film across the face of the fluorescent screen, a light sensitive device for transferring the variations in light transmitted by the film into variations of voltage, an amplifier for amplifying the voltage variations and applying the amplified power to a radar indicating device having a movable deflection means which directs a second cathode beam to a desired section of a plan position indicator screen, a mechanical coupling means which transfers the motion of said movable deflection means to a differential gear mechanism which is also coupled to the constant speed film motor and delivers the combined motion to a contact arm on a voltage divider which carries direct current supplied by a constant voltage source and produces a linear potential drop along a line of contact with said arm, means for transferring the potential of the contact arm to a deflection means for controlling the movement of the first cathode beam in the direction of movement of the film transparency, and control means generated by the radar indicating device for controlling the movement of the first cathode beam in a direction at right angles to the movement of the film transparency.

7. A moving radar target generating device according to claim 6 wherein the control means generated by the radar indicating device comprises a series of discrete voltage pulses and controls the generation of a sawtoothed voltage wave to deflect the first cathode beam in a direction at right angles to the movement of the transparency.

References Cited in the file of this patent

UNITED STATES PATENTS

| | | |
|---|---|---|
| 2,406,751 | Emerson | Sept. 3, 1946 |
| 2,540,943 | Hales | Feb. 6, 1951 |